United States Patent
Bauer

(10) Patent No.: US 6,688,726 B2
(45) Date of Patent: Feb. 10, 2004

(54) SYSTEM AND METHOD FOR PRODUCING PRINT MASKS TO ELIMINATE STEP ADVANCE AND SWATH HEIGHT ERROR BANDING

(75) Inventor: Stephen W. Bauer, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/968,198

(22) Filed: Sep. 29, 2001

(65) Prior Publication Data
US 2003/0063153 A1 Apr. 3, 2003

(51) Int. Cl.[7] .................................................. B41J 2/15
(52) U.S. Cl. ...................................................... 347/41
(58) Field of Search ............................. 347/12, 13, 40, 347/41

(56) References Cited

U.S. PATENT DOCUMENTS 4,622,560 A * 11/1986 Withoos et al. ............... 347/12
5,384,587 A * 1/1995 Takagi et al. .................. 347/41
5,600,351 A * 2/1997 Holstun et al. ................ 347/40

FOREIGN PATENT DOCUMENTS

EP          0631870 A2 *  4/1995  ............. B41J/2/16

\* cited by examiner

Primary Examiner—Stephen D. Meier
Assistant Examiner—Julian D. Huffman

(57) ABSTRACT

The present invention is embodied in a system and method for producing print masks to eliminate step advance and swath height error banding. In general, a print mask is probabilistically produced that corrects swath height errors and step advance errors. A printhead controller determines the firing order of the nozzles in a single or multiple swath with particular reference to a probabilistic print mask generator. The generator functions to firstly calculate the ramp height on a formula to include pen height, data resolution, the number of passes and the pen nozzle resolution. Secondly, taking the ramp height into consideration, the controller allocates on a random basis from the print mask, the firing of nozzles, so that the ramp may begin at zero, although other values may be desirable in preserving the life of the printhead, and ends at the ramp height.

2 Claims, 4 Drawing Sheets

SYSTEM AND METHOD FOR PRODUCING PRINT MASKS TO ELIMINATE STEP ADVANCE AND SWATH HEIGHT ERROR BANDING

FIELD OF THE INVENTION

The present invention generally relates to inkjet and other types of printers and more particularly, to a system and method for producing print masks to eliminate step advance and swath height error banding.

BACKGROUND OF THE INVENTION

Inkjet printers print dots by ejecting very small drops of ink onto the print medium and typically include a movable carriage that supports one or more print cartridges each having a printhead with a nozzle member having ink ejecting nozzles. The carriage traverses over the surface of the print medium. An ink supply, such as an ink reservoir, supplies ink to the nozzles. The nozzles are controlled to eject drops of ink at appropriate times pursuant to command of a microcomputer or other controller. The timing of the application of the ink drops is intended to correspond to the pattern of pixels of the image being printed.

To complete a full line, the print head passes a specified number of times in a single or multi pass pattern. This multiple pass way of printing is called a printmode. The print mode may have a number of parameters; the number of passes required to fill an area, and the position of the ink droplets at every pass. To define this feature, a matrix is created that defines each position of each pass in which a drop may print. The matrix is called the printmode mask.

Lines, text and graphics are normally printed with all nozzles aligned in the horizontal or scan axis. Defects, including tails, spray drops and spear drops, can result in rough edges, vertical lines, horizontal lines, banding, and changes in hues on the print media. These defects may be due to a number of factors including nozzle alignment, nozzle outs, firing frequency, pen noise, print media advance, or swath height error.

The pattern on the print media is altered due to step advance errors. A large step advance error would increase the probability of banding. In a multiple pass mode the effects would be for more clearly defined bands representing areas of ink overlap from each pass between areas of ink overlay without ink from one or more passes of the printhead. In the case of a smaller step advance errors the area of ink overlap on the print media for all passes of the printhead would increase, while the areas which do not have ink from one or more passes of the printhead would be less. In this case the areas of light streaking would be narrower but would occur more frequently.

A further challenge in assuring print quality is the reduction or compensation for swath height error (SHE). SHE may be produced from mechanical, electrical, or other sources that result in dot placement artifacts in the paper axis during printing. Inkjet printers have used a variety of methods to compensate for artifacts in the scan axis, however, correction for artifacts in the paper axis have been limited to adjustments of the media advance. Therefore, what is needed is a system and method to solve these problems.

SUMMARY OF THE INVENTION

To overcome the limitations in the prior art described above, and to overcome other limitations that will become apparent upon reading and understanding the present specification, the present invention is embodied in a system and method for producing print masks to reduce the effects of step advance and swath height error banding.

The printing system of the present invention includes a printhead assembly and an ink supply for printing ink on print media. The printhead assembly includes a printhead body, ink channels, a substrate, such as a semiconductor wafer, a nozzle member and a barrier layer located between the wafer and nozzle member. The printhead has a controller, which can be firmware, software or any suitable processor that can control the ejection of ink from the plural nozzles. The controller can be defined in the integrated circuit as receiving data stored in the data in the buffer memory, assigning primitive addresses in the heater array from the data, and determining the firing pulse rate of the heater elements in the heater array. The controller can be created by any suitable integrated circuit manufacturing or programming process.

The controller determines the firing order of the nozzles in a single or multiple swath with particular reference to a probabilistic print mask generator. The generator functions to firstly calculate the ramp height on a formula to include pen height, data resolution, the number of passes and the pen nozzle resolution. Secondly, taking the ramp height into consideration, the controller allocates on a random basis from the print mask, the firing of nozzles, so that the ramp may begin at zero, although other values may be incorporated to preserve the reliability of the pen, and ends at the ramp height. The system increases the firing rate for centrally located nozzles so that the total ink per unit area of media is equal to that of a conventional print pass. The feature of this system is that swath height error and step advance error effects on the printed image are decreased.

BRIEF DESCRIPTION OF THE DRAWINGS

The present invention can be further understood by reference to the following description and attached drawings that illustrate the preferred embodiment. Other features and advantages will be apparent from the following detailed description of the preferred embodiment, taken in conjunction with the accompanying drawings, which illustrate, by way of example, the principles of the invention.

DETAILED DESCRIPTION OF THE PREFERRED EMBODIMENTS

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Figure 1:
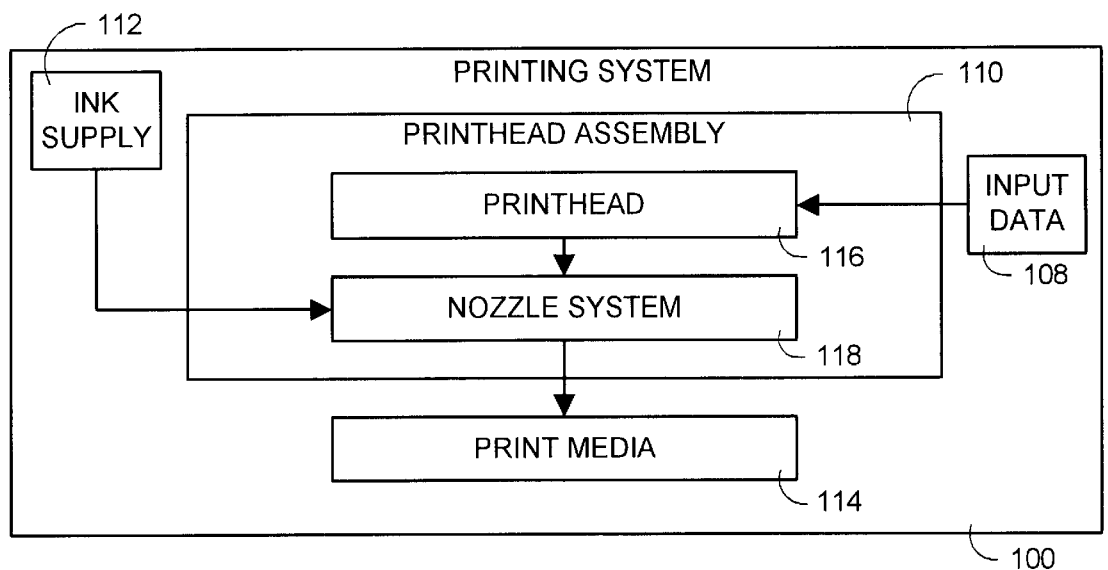
FIG. 1 shows a block diagram of an overall printing system incorporating the present invention.

I. General Overview:

FIG. 1 shows a block diagram of an overall printing system incorporating the present invention. The printing system 100 of the present invention includes a printhead assembly 110, an ink supply 112 and print media 114. Input data 108 is forwarded to the printhead body 116, which controls the firing of nozzles in the nozzle system 118. The nozzle system is supplied with ink from the ink supply 112.

During a printing operation, ink is provided from the ink supply 112 to an interior portion (such as an ink reservoir) of the printhead assembly 110. The printhead assembly 110 receives commands from a controller in the printhead body 116 to print ink and form a desired pattern for generating text and images on the print media 114. Images are printed with image processing, which includes receiving data representing a desired image and developing from those data specific moment-by-moment commands to a printing mechanism. This task, for purposes of the present document, will be called "image processing".

Such processing typically includes, at the outset, some form of darkness and contrast control or adjustment. In a color printer, this preprocessing stage analogously also includes color conversions and any needed color corrections. Preprocessing can handle both user-desired color modification and any known mismatch between an input-image color specification and the operating color space and gamut of the printer.

Print quality of the desired pattern is dependent on the pattern and accuracy of the placement of the ink droplets on the print media 114. In one embodiment, print quality is maintained by modifying the pattern of ink droplet placement. This can be achieved by selecting the number of nozzles firing in each pass of the printhead. In an embodiment of the present invention the controller 116 selects the nozzles to be fired.

Figure 2:
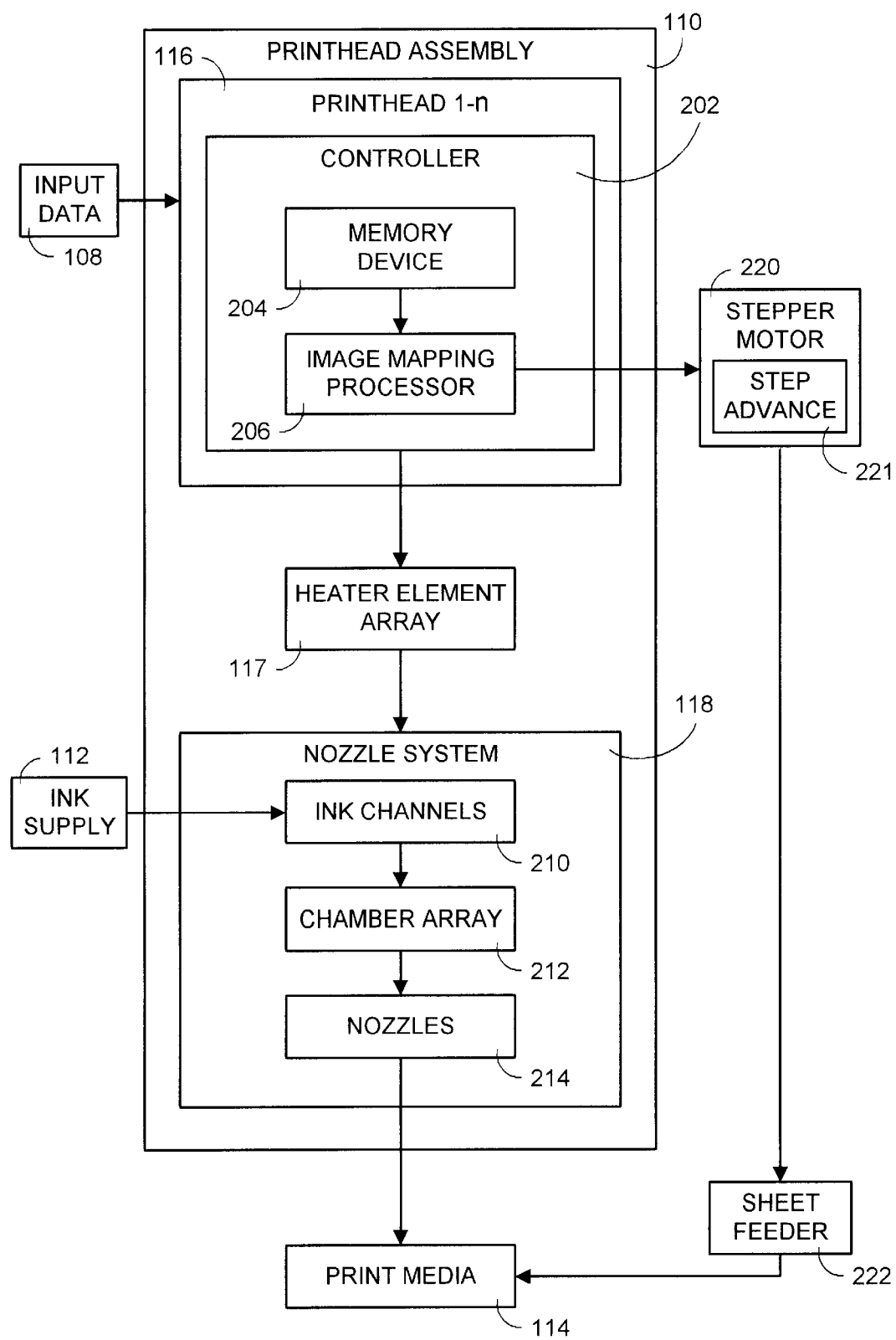
FIG. 2 is a high level flow diagram illustrating the image mapping processor of the present invention incorporated in multiple pass printing swaths.

II. Details of the Components:

Referring to FIG. 1 along with FIG. 2, the printhead assembly 110 is comprised of a printhead body 1–n 116 a heater element array 117 and a nozzle system 118 linked to an ink supply 112. The printhead body 1–n 116 includes a controller 202, which can be any integrated circuit, software, firmware etc. The controller 202 contains a memory device 204, and an image mapping processor 206. When data enters the system from the input data 108 it is held in the memory device 204 of the controller 202 while the image mapping processor 206 analyzes the data. After the image mapping processor 206 has assigned pixel locations for the data these locations are registered at their respective primitive addresses in the controller 202.

The address files link with the printhead 1–n, 116 controllers (not shown) that assign a rate of firing by a data rate system that in turn forwards the pattern of firing to the heater array element 117. The heater array element 117 heats the ink in the ink chambers 212 and expels ink droplets through the nozzles 214 in the nozzle system 118. The ink nozzles 214 preferably contain plural parallel rows of offset nozzles. It should be noted that other nozzle arrangements can be used, such as non-offset parallel rows of nozzles.

The image mapping processor also co-ordinates the activation of the stepper motor 220. After each sweep of the printhead 116 the stepper motor rotates a step advance 221 so that the sheet feeder 222 moves the print media 114 forward a distance of a step advance 221.

Figure 3:
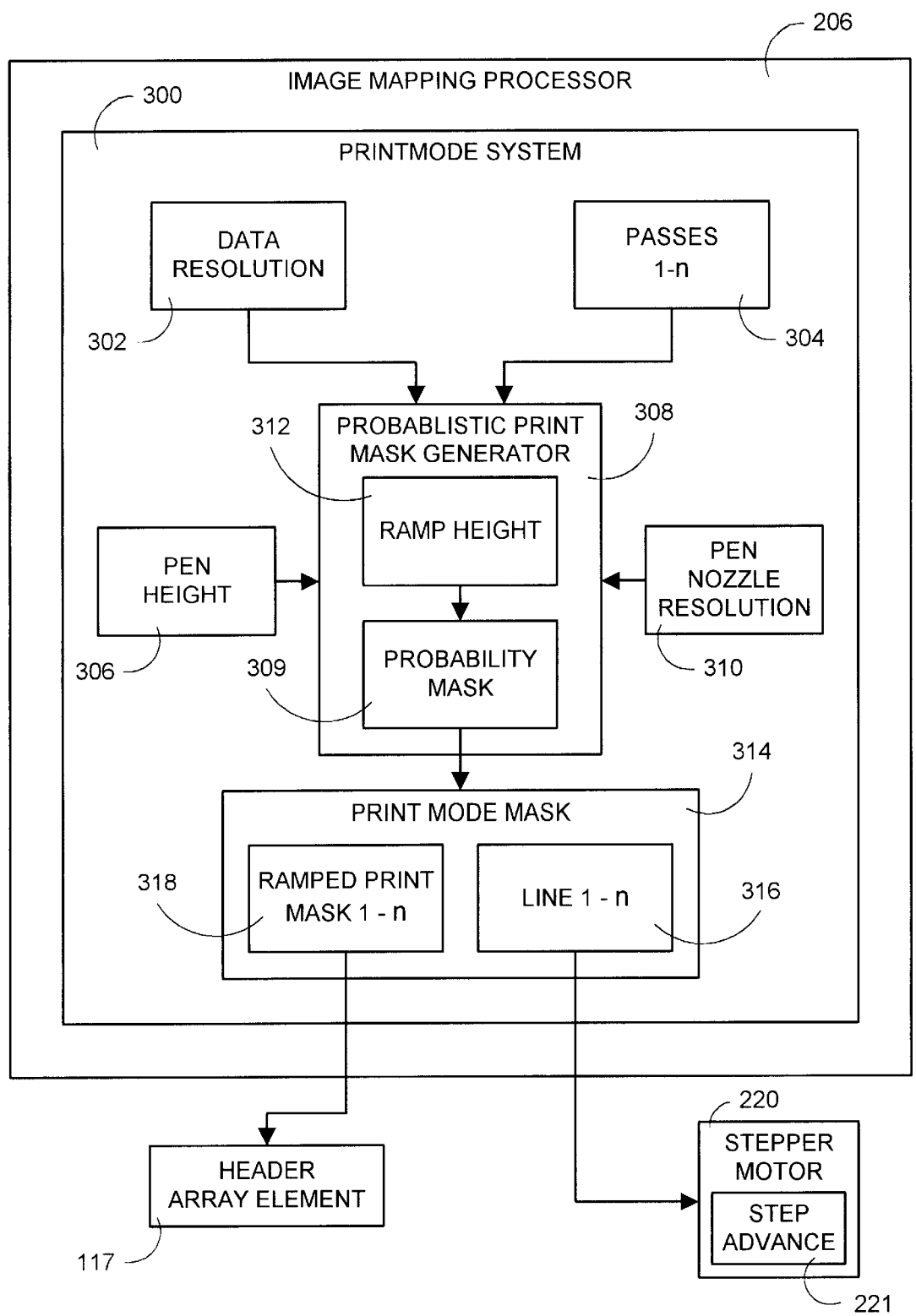
FIG. 3 is a high level flow diagram illustrating the probabilistic print mask generator of the present invention.

III. Details of the Operation:

FIG. 3 is a high level flow diagram illustrating the present invention used in the development of the print mask 314. Printmodes can lay down in each pass of a printhead only a fraction of the total colorant required in each section of the image. Any areas left white or light in each pass tend to be filled in during one or more later passes. These printmodes not only tend to control bleed, blocking and cockle by reducing the amount of colorant that is deposited on the page essentially at once, but also help greatly to conceal banding effects. Several printing passes can be overlapping, so that each swath of colorant tends to hide the kinds of banding due to periodic errors in printing-medium advance mechanisms.

For instance, even blank space between the edges of two inaccurately abutting swaths can be covered by at least some colorant that is well within the boundaries of at least one other swath. Depending on the total number of passes, such blanks may be covered by as many as e.g. three other swaths—in a four-pass printmode—or even more. To put it another way, only one in four drops is missing along such a "blank" pixel row, and the non-uniformity is far less noticeable. The specific partial-inking pattern is a "printmask". The way in which these different patterns or masks add up to a single fully inked image is the "printmode".

Whereas the image-processing stage establishes spatial assignments of color spots to pixels, the printmasking stage establishes temporal assignments of color spots as among the several printing passes that have access to each pixel. Printmasking can be performed downstream from image processing. A print mask is a binary pattern that determines exactly which ink drops are printed in a given pass, or which passes are used to print each pixel. In a printmode of a certain number of passes, each pass should print, of all the ink drops to be printed, a fraction equal roughly to the reciprocal of that number.

As a practical matter, however, typical print masks deal with the pixels to be addressed, rather than "printed". The difference resides in the details of an individual image, which determine whether each particular pixel will be printed in one or another color, or left blank. Thus, a print mask can be used to determine in which pass each pixel will be addressed, and the image as processed through various other rendition steps will determine whether each addressed pixel is actually printed, and if so with what color or colors. In other words, the print mask can be used to "mix up" the nozzles used, as between passes, in such a way as to reduce undesirable visible printing artifacts, such as banding, etc.

Referring to FIGS. 1–2 along with FIG. 3 the image mapping processor 206 organizes the data. In this process a determination is made as to whether there will be a single pass or a multiple pass in the print swath. The selection of the pass number is forwarded to the print mode system 300 and stored in passes 1–n 304. The image mapping processor 206, also calculates the resolution of the input data which is stored in the data resolution 302 and forwarded to the probabilistic print mask generator 308, along with the passes 1–n, 304, the pen height 306 and the pen nozzle resolution 310. A function of the probabilistic print mask generator 308 is the calculation of the ramp height 312.

$$\text{Ramp Height} = \frac{(\text{pen height} * \text{data resolution})}{(\# \text{ passes} * \text{pen nozzle resolution})}$$

This calculation is forwarded to the probability mask 309.

The probability mask 309 allocates nozzles at random from zero to a number equal to the ramp height 312 number along the gradation of the leading printhead 116 edge to the ramp height 312, and from the ramp height 312 to zero along the gradation of the trailing printhead 116 edge. This probability mask 309 is incorporated in the print mask 314 as the ramped print mask 1–n 318.

The print mask 314 determines the number of lines to be incorporated in the print sweep as well as the nozzles that will fire in each sweep. Line 1–n 316 data are forwarded from the print mask 314 to the stepper motor 220; and controllers in the printhead 1–n, 116, fire the elements in the heater element array 117 resulting in ink droplets being expelled from the nozzles 214 to the print media 114.

In the past, programs have mapped a consistent number of nozzle rows to a given data row. For example, printing 600 dpi data with two 300 dpi nozzle rows. With the advent of high nozzle per inch printheads it has become possible to improve dot placement artifacts in the paper axis using variable mapping of nozzle rows to data rows. Previous printers have used a variety of methods to compensate for dot placement artifacts in the scan axis and adjusting for SHE in the paper axis.

The print masks have a matrix of numbers. The rows of the mask correspond to the nozzles of the pen and the columns of the mask correspond to the columns of the printed page. These masks can be any physical size from one row and 1 column up to an array as large as the source data. A probability print mask is defined by probability of nozzle usage varying along the printhead by changing probability in each column of the mask.

For example, consider an image with black dots and white dots located on pixels of a printed document. The document would have a smaller number of white dots near the top and bottom pixels of the document and progressively more black dots near the middle pixels. In this example, the black dots would show nozzles being used on that pixel and white dots would show nozzles not being used on that pixel.

Figure 4:
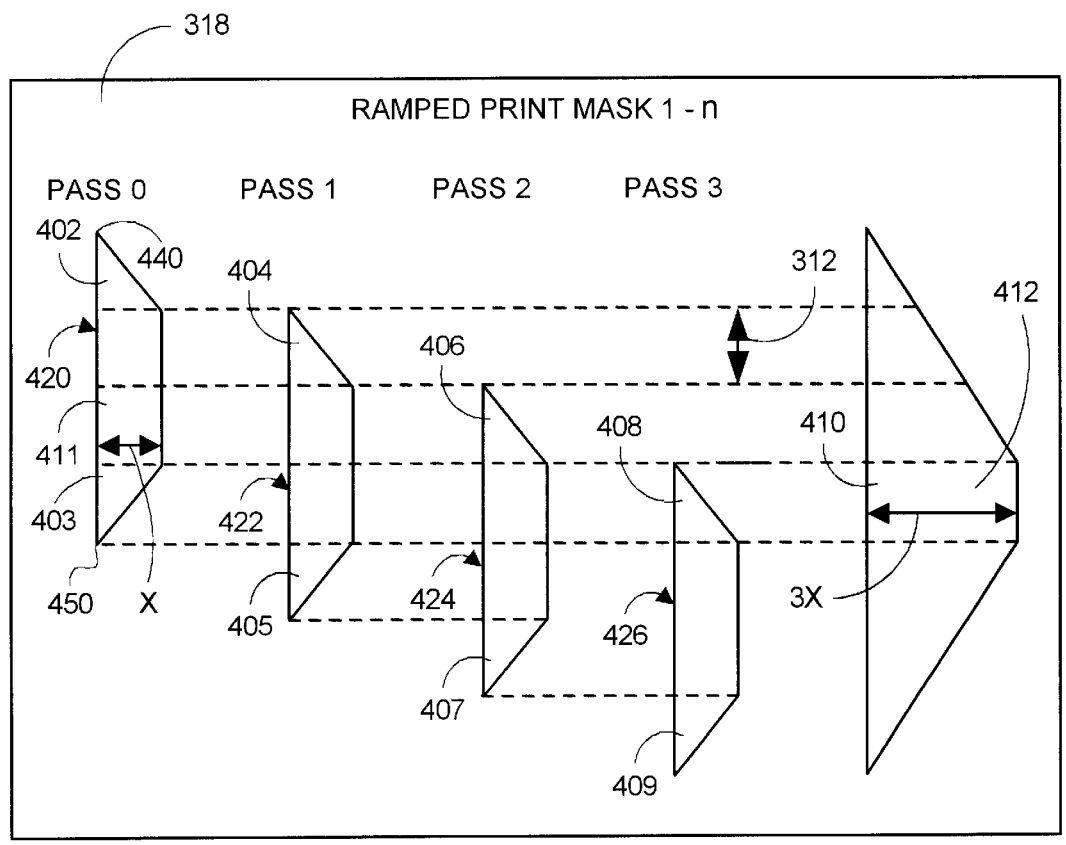
FIG. 4 illustrates the ramped print mask of the present invention.

Current compensation methods for paper axis dot placement errors are inadequate where there is a need for correction for errors due to variation in swath height error (SHE). FIG. 4 shows the incorporation of four ramped print masks, 420, 422, 424 and 426 in a line of print 410. The ramped print masks have leading edge masks 402, 404, 406 and 408 calculated by the probability mask 309, and similarly trailing edge masks, 403, 405, 407 and 409. The combined height of either the leading edge or trailing edge ramped print masks equal the ramp height 312. As such, in FIG. 4, point 440 represents the first nozzle and point 450 represents nozzle n. The portion between point 440 and point 450 represent the nozzles and the portion represented by "x" is the probability of usage.

The maximum nozzle density 411 for any pass of the printhead can be given a value of "x". For one line of print 410, the maximum nozzle density would be 3x, the maximum line density 412. The ramped print mask 1–n 318 varies the probability of nozzle usage along the length of the pen. In this embodiment, the reduced usage of end nozzles requires the increased usage of middle nozzles to compensate. The maximum line density 412 (total ink per unit area per print pass) is 3x, however a conventional print mask would be able to print 4x the maximum density in a four pass print mode as illustrated in FIG. 4. Hence while the endmost nozzles may be reduced to zero usage with the ramped mask, the center nozzles may have to fire 4/3 times as fast as the center nozzles of a conventional square print mask. Thus, the probability is equal to the maximum number of ink drops per pixel divided by the number of passes minus 1. Other values may also be incorporated to preserve the life of the printhead.

The ramped print mask 1–n 318 in the embodiment referred to above, would print an image consistent with a conventional print mask given there were no swath height errors. Unlike the conventional print mask, the present invention decreases the effects on the print media 114 when positive or negative swath height errors occur. For conventional systems, positive step advance errors appear as light streaks and negative step advance errors appear as dark streaks. With this system the overall image is imperceptibly lighter for positive advance errors and imperceptibly darker for negative swath advance error, but no streaking or banding occurs. That is, the banding seen with conventional print masks from SHE or step advance errors is eliminated with the ramped print masks.

Figure 5:
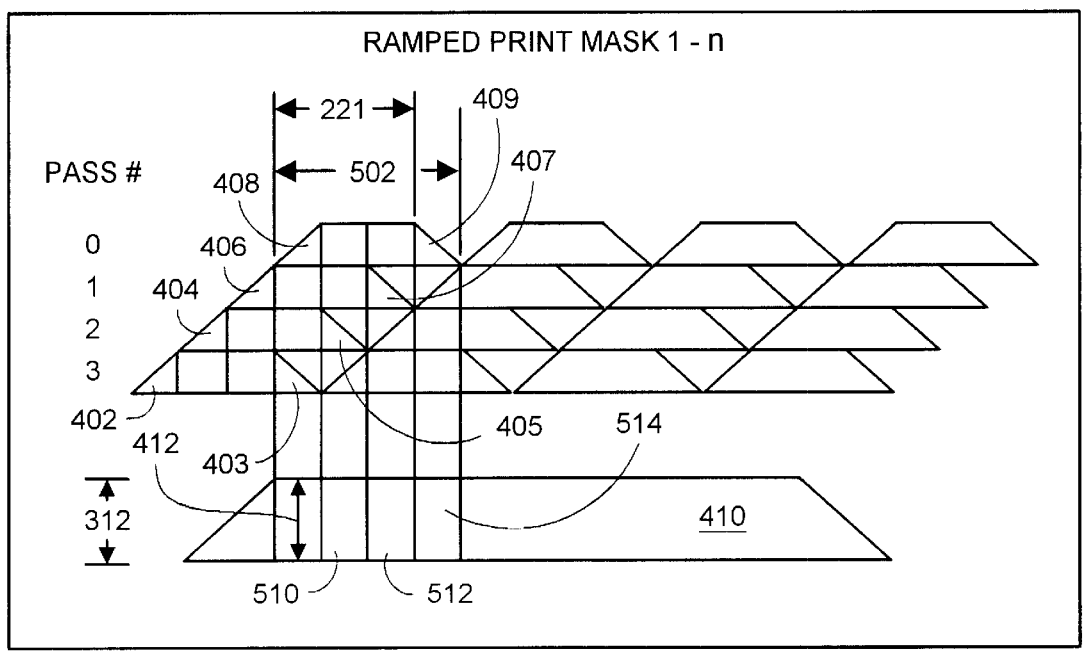
FIG. 5 illustrates the relationship between the ramped print mask and the step advance error.

FIG. 5 is a diagram showing a preferred embodiment of the present invention incorporating a step advance error 502, which is 125% of the nominal step advance 221. In this illustration, four step advances incorporating the step advance error 502 would be equal to 5 nominal step advances 221. In the case of an overadvance, the total ink per unit area of media (412, 510, 512, and 514) would be decreased, and vice versa for an under advance. This would also hold true for the leading and trailing edge masks 402, 404, 406, 408, 403, 405, 407, and 409. However the effect of the ramped masks is to reduce white streaks from overadvances, and dark streaks from underadvances. The ramp height is traditionally set to one step advance distance. This does not work well because the pixels on the page would be ramped on either the first or last pass, but not on both when using a print head with less spatial nozzle resolution than the source data (such as a 600 DPI printhead with 1200 DPI source data).

Figure 6:
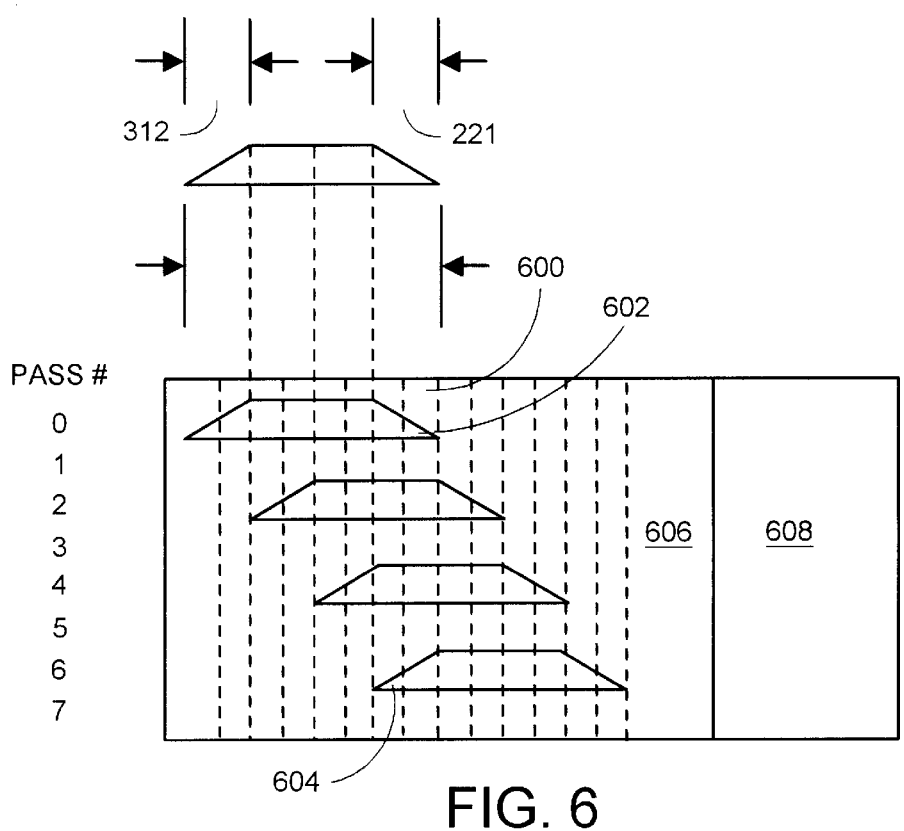
FIG. 6 illustrates pixels produced by the ramped print mask of the present invention.

For the special condition of printing data with higher spatial resolution than the nozzle spacing a version of the ramped print mask 1–n 318 is required that will obtain its benefits. A preferred embodiment is illustrated in FIG. 6. Pixel 600 is ramped on the first pass 602 and the last pass 604. Successive pixels 606, 608 will similarly be ramped on more than one pass. The effect is to decrease banding due to step advance error. The overall effect is to reduce the effect of step advance error and swath height error so that there is an improvement in image quality on the print media 114.

The foregoing has described the principles, preferred embodiments and modes of operation of the present invention. However, the invention should not be construed as being limited to the particular embodiments discussed. As an example, the above-described inventions can be used in conjunction with inkjet printers that have multiple printheads, as well as inkjet printers that are of the single printhead type. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. An ink jet printhead for printing images on print media, comprising:
    a processor coupled to a controller that provides access to first and second sets of data; and
    a nozzle member that uses the first set of data to eject ink and uses the second set of data to probabilistically produce a ramped print mask that corrects swath height errors and step advance errors, wherein the ramped print mask increases the usage of middle nozzles in a pass to compensate for end nozzle usage;
    wherein the ink jet printhead prints plural pixels of ink on the print media and each pixel has a first pass ramp and a last pass ramp.

2. A printing system for printing images on print media, comprising a printhead with nozzle members for ejecting ink, wherein the nozzle members eject ink and probabilistically produce a ramped print mask that increases the usage of middle nozzles in a pass to compensate for end nozzle usage with the ink that corrects swath height errors and step advance errors, wherein the nozzle members each print plural pixels of ink on the print media and each pixel has a first pass ramp and a last pass ramp.

* * * * *